United States Patent
Brook et al.

(10) Patent No.: US 8,695,357 B2
(45) Date of Patent: Apr. 15, 2014

(54) PRESSURE CONTROL OF CRYOGENIC LIQUIDS

(75) Inventors: Thomas Brook, Shawinigan Lake (CA); Valerie LeBlanc, Vancouver (CA)

(73) Assignee: Westport Power Inc., Vancouver, British Columbia (CA)

(*) Notice: Subject to any disclaimer, the term of this patent is extended or adjusted under 35 U.S.C. 154(b) by 175 days.

(21) Appl. No.: 13/218,025

(22) Filed: Aug. 25, 2011

(65) Prior Publication Data

US 2011/0314839 A1 Dec. 29, 2011

Related U.S. Application Data

(63) Continuation of application No. PCT/CA2010/000212, filed on Feb. 16, 2010.

(51) Int. Cl.
  *F17C 7/04* (2006.01)
  *F17C 13/02* (2006.01)

(52) U.S. Cl.
  USPC .............................................. 62/50.2; 62/49.1

(58) Field of Classification Search
  USPC ......... 62/49.1, 205, 206, 207, 224, 50.1, 50.2
  See application file for complete search history.

(56) References Cited

U.S. PATENT DOCUMENTS

| | | | |
|---|---|---|---|
| 3,864,928 A | 2/1975 | Eigenbrod | |
| 4,406,129 A * | 9/1983 | Mills | 62/7 |
| 5,325,894 A * | 7/1994 | Kooy et al. | 141/4 |
| 5,421,161 A | 6/1995 | Gustafson | |
| 5,571,231 A * | 11/1996 | Lee | 62/48.2 |
| 5,590,535 A * | 1/1997 | Rhoades | 62/50.2 |
| 5,771,946 A * | 6/1998 | Kooy et al. | 141/82 |
| 5,787,940 A | 8/1998 | Bonn et al. | |
| 6,125,637 A | 10/2000 | Bingham et al. | |
| 6,334,312 B1 | 1/2002 | Mack et al. | |
| 6,474,101 B1 * | 11/2002 | Quine et al. | 62/657 |
| 6,494,191 B2 | 12/2002 | Bingham et al. | |
| 6,619,273 B2 | 9/2003 | Bingham et al. | |
| 6,953,028 B2 | 10/2005 | Bingham et al. | |
| 7,044,113 B2 | 5/2006 | Bingham et al. | |
| 7,144,228 B2 | 12/2006 | Emmer et al. | |

FOREIGN PATENT DOCUMENTS

| | | | | |
|---|---|---|---|---|
| EP | 1712831 | | 10/2006 | |
| JP | 2005-308149 | | 4/2005 | |
| JP | 2005308149 | * | 4/2005 | ............... F17C 9/00 |
| JP | 2006-329359 | | 7/2006 | |
| JP | 2006329359 | * | 7/2006 | ............... F17C 9/02 |

OTHER PUBLICATIONS

Canadian Office Action issued on May 12, 2009 in connection with Canadian Patent Application No. 2,653,643 filed Feb. 26, 2009.
International Search Report issued on Mar. 23, 2010 in connection with International Application No. PCT/CA2010/000212 filed Feb. 16, 2010.
International Preliminary Report on Patentability issued on Oct. 22, 2010 in connection with International Application No. PCT/CA2010/000212 filed Feb. 16, 2010.

* cited by examiner

*Primary Examiner* — Frantz Jules
*Assistant Examiner* — Brian King
(74) *Attorney, Agent, or Firm* — Corridor Law Group, P.C.

(57) ABSTRACT

A pressure control system comprises separate conduits for supplying liquefied gas and vapor from a cryogen space defined by a cryogenic storage tank. A first conduit can deliver liquefied gas to a use device through a heater and then a first flow controller. A second conduit can deliver vapor to the use device with flow therethrough controlled by a second flow controller. The first flow controller is not exposed to liquefied gas at cryogenic temperatures because it is located downstream from the heater. For automatic operation a pressure sensor measures pressure inside the cryogen space and the first and second flow controllers are independently operable to maintain the pressure inside the cryogen space within a predetermined range. In a preferred embodiment the liquefied gas is a combustible fuel that is consumed by an internal combustion engine, which is the use device.

19 Claims, 3 Drawing Sheets

PRESSURE CONTROL OF CRYOGENIC LIQUIDS

CROSS-REFERENCE TO RELATED APPLICATION(S)

This application is a continuation of International Application No. PCT/CA2010/000212, having an international filing date of Feb. 16, 2010, entitled "Pressure Control System And Method". The '212 international application claimed priority benefits, in turn, from Canadian Patent Application No. 2,653,643 filed Feb. 26, 2009. The '212 international application is hereby incorporated by reference herein in its entirety.

FIELD OF THE INVENTION

The present invention relates to a system and a method for automatically controlling the pressure inside a tank for storing fluids at cryogenic temperatures and preventing the freezing of valves placed on fuel delivery lines that connect the tank with a use device.

BACKGROUND OF THE INVENTION

Fluids at cryogenic temperatures, also referred to herein as "cryogenic fluids", include liquefied gases that can have boiling points below −100° C. (about −150° F.) at atmospheric pressure. Examples of such fluids include liquefied natural gas (LNG) and other gases, such as nitrogen, oxygen, carbon dioxide, methane and hydrogen that are storable in liquefied form at cryogenic temperatures.

A problem with known storage tanks that store cryogenic fluids is that heat leak into the storage space can cause vaporization of some of the stored liquefied gas causing the pressure within the tank to rise above the relief pressure set point, reducing the time that liquefied gases can be held within the tank without venting to relieve the pressure. It is generally preferable to avoid venting any fluid since, among other reasons. This results in a loss of the stored fluid, instead of the lost fluid being delivered to the use device. In this disclosure, vapor is defined as a substance in the gas phase at a temperature lower than its critical temperature, which means that a vapor can be condensed to a liquid or converted to a solid by increasing the pressure, without reducing the temperature.

As an alternative to venting into the atmosphere, by way of example, the cryogenic delivery and storage system illustrated in U.S. Pat. No. 5,421,161 shows an economizer circuit that includes a line connecting the vapor space in the tank to a delivery line that supplies fuel to the use device. When the pressure in the tank rises above a predetermined level a regulator included in the economizer circuit opens the flow of vapor from the vapor space inside the tank to the use device. By taking vapor from the vapor space, the pressure inside the tank falls. The system further comprises a line for delivering liquid fuel from the liquid space of the tank to the use device through a relief valve and a vaporizer. The vaporizer converts the cryogenic fluid stored in the tank into the gas phase so that gas can be delivered to the use device and the relief valve provides a fixed back pressure in the liquid fuel delivery line. When the regulator in the economizer circuit is open, more vapor flows from the vapor space inside the tank because the back pressure created in the liquid delivery line creates a path of least resistance through the economizer circuit. This system allows a relatively fast drop in pressure in the tank when needed, although it does present the disadvantage that the predetermined value of the tank pressure which triggers the opening of the regulator in the economizer circuit can not be adjusted. Another disadvantage is that the relief valve on the liquid delivery line is susceptible to freezing because the liquefied gas, which is at cryogenic temperatures, circulates therethrough.

Another example of an economizer circuit for reducing the pressure in a cryogenic tank without venting vapor into the atmosphere is described in U.S. Pat. Nos. 6,125,637, 6,494, 191, 6,619,273, 6,953,028 and 7,044,113. These patents describe an economizer circuit that comprises a so-called economizer valve that is connected to a conduit extending from the vapor space of the tank and, also to a conduit extending from the liquid space of the tank. The economizer valve selectively withdraws either liquefied gas or vapor from the tank depending on the pressure within the vapor space inside the tank. The selected fluid, either liquefied gas or vapor, passes through a vaporizer disposed downstream of the economizer valve. The economizer valve described in U.S. Pat. No. 6,125,637 is configured to automatically operate in one of two positions for either withdrawing vapor or liquefied gas from the storage tank. In this respect this economizer circuit is similar to the one described before because it does not allow a gradual pressure decrease in the tank. The system is designed to automatically and passively maintain a predetermined pressure within the vapor space of the fuel tank without using any electrically actuated flow controlling devices. No adjustment of the predetermined range of the optimal pressure within the tank can be performed because the economizer valve is set to switch from one position to the other at a predetermined pressure.

The economizer valve described in U.S. Pat. Nos. 6,494, 191, 6,953,028 and 7,044,113, although similar to the one described in U.S. Pat. No. 6,125,637, is different in that it allows a gradual drop in pressure inside the storage tank because it enables an intermediate position of the valve member such that both liquefied gas and vapor can be delivered from the storage tank at the same time. Also, the valve member can be actuated by a solenoid and therefore the liquefied gas and vapor delivery times can be adjusted.

Another example of adjusting the pressure inside a cryogenic storage tank is described in U.S. Pat. No. 6,334,312. Gaseous medium is supplied from the cryogenic tank to the consumer until the pressure inside the tank drops, at which time the supply is switched to liquid medium. The liquid medium is vaporized in a heat exchanger placed outside of the storage tank before it is delivered to the consumer. The gaseous and liquid medium withdrawal lines are joined into a common line. The switching of fuel supply between the gaseous and liquid mediums is done through a valve that is disposed on the common line inside a vacuum insulated area of the storage tank or inside the storage tank. The valve is actuated by an electrochemical actuator. The heat exchanger for vaporizing the liquid medium is disposed downstream of the valve. While the risk of freezing the valve is recognized as a potential problem, the proposed solution is to place the valve and its electrochemical actuator inside the storage tank, which is very expensive and does not allow an easy access to the valve for replacement or maintenance purposes.

In all of the embodiments illustrated in the previously mentioned patents the economizer valve is placed upstream of the vaporizer in the line that delivers the gas to a use device. This creates challenges in operating an economizer valve under optimum conditions because of the potential for freezing. Accordingly, there is a need for a system and a method of maintaining the pressure inside a storage tank for holding fluids at cryogenic temperatures within the predetermined values while preventing the freezing of the system components.

SUMMARY OF THE INVENTION

A pressure control system maintains the pressure inside a tank within predetermined values. The system comprises a storage tank defining a cryogen space for storing liquefied gas and vapor at cryogenic temperatures, a first conduit and a second conduit through which liquefied gas and respectively vapor can be delivered to the use device and a heater that is operable to vaporize the liquefied gas before it is delivered to the use device. The first conduit through which the liquefied gas can be delivered to the use device connects the lower portion of the cryogen space to the heater and further to the use device. The second conduit through which vapor can be delivered to the use device connects the vapor space inside the cryogen space to the use device. A flow controller is disposed on each of the conduits. The flow controller on the first conduit is disposed downstream of the heater. Each of these flow controllers is independently actuated to control the pressure inside the tank.

The heater can be for example a heat exchanger, a vaporizer or an electrical heater. In some embodiments, the first and second conduits can each have a separate heater and in these embodiments the heater can be a single-line vaporizer or heat exchanger. In some other embodiments where both conduits are connected to the heater, the heater can be a multi-line vaporizer or heat exchanger.

The pressure inside the cryogen space defined by the tank is measured by a pressure sensor. The control system further comprises a controller programmed to actuate at least one of the flow controllers disposed on the first and second conduits based on the signal received from the pressure sensor to maintain the pressure inside the tank between predetermined values. For example, when the pressure inside the cryogen space is below a predetermined low threshold, the flow controller disposed on the second conduit is kept closed and the gas is delivered to the use device only through the flow controller disposed on the first conduit which delivers liquefied gas to the use device. When the pressure inside the cryogen space is higher than a predetermined high threshold, the flow controller disposed on the first conduit is closed and gas is delivered to the use device only through the flow controller that is disposed on the second conduit which delivers vapor to the use device. When the pressure inside the cryogen space is between the predetermined low and high thresholds then both flow controllers can be open and gas can be delivered to the use device through both the first and second conduits, with more gas delivered through the liquefied gas conduit when the pressure inside of the cryogen space is closer to the predetermined low threshold, and more gas delivered through the vapor conduit when the pressure inside the cryogen space is closer to the predetermined high threshold.

The controller can be programmed to actuate both flow controllers disposed on the first and on the second conduits responsive to the pressure measurements by the pressure sensor to maintain the pressure inside the cryogen space between predetermined values. The flow controllers on the first and second conduits can be flow control valves, preferably electrically actuated valves, such as, for example solenoid valves which can be actuated by the controller.

In a preferred embodiment, the first conduit and the second conduit merge into a common conduit that supplies vaporized liquefied gas to the use device. The use device can be a natural gas fuelled internal combustion engine and the liquefied gas comprises at least one of methane, ethane, natural gas, hydrogen, butane, propane and mixtures thereof.

In another embodiment, the second conduit delivers vapor to the heater which is operable to warm the vapor before it is delivered to the use device, and the second flow controller is disposed on the second conduit downstream from the heater.

In yet another embodiment, the pressure control system comprises a second heater, separate from the heater connected to the first conduit, wherein the second conduit through which vapor is delivered to the use device is connected to the second heater for warming up the vapor upstream of the second flow controller. The second heater can be a single-line vaporizer or heat exchanger, or an electrical heater.

A method is provided for controlling the pressure inside a cryogen space defined by a storage tank and delivering fluid from the cryogen space to a use device. The method comprises:
  holding liquefied gas and vapor inside the cryogen space at a cryogenic temperature;
  selectively delivering liquefied gas or vapor from the cryogen space to the use device by:
    directing liquefied gas through a first conduit that passes through a heater and then a first flow controller before delivering fluid to the use device; and
    directing vapor through a second conduit that passes through a second flow controller before delivering fluid to the use device.

In the method already described the pressure within the cryogen space is measured and the first and second flow controllers are actuated responsive to the measured pressure to maintain pressure within the cryogen space between predetermined values.

In a preferred method, the vapor in the second conduit is warmed before being directed to the second flow controller.

The first and second flow controllers can be flow control valves, and more specifically electrically actuated flow control valves, for example solenoid valves.

In a preferred method, the use device is an internal combustion engine and the liquefied gas and vapor is fuel that is consumed by the internal combustion engine.

A method is provided for controlling the pressure inside a cryogen space defined by a storage tank, and delivering fluid from the cryogen space to a use device. The method comprises:
  measuring the pressure inside the cryogen space with a pressure sensor;
  communicating the measured pressure to an electronic controller;
  directing liquefied gas being delivered from the cryogen space to the use device through a first conduit that passes through a heater and transforming the liquefied gas into vapor;
  directing vapor delivered from the cryogen space to the use device through a second conduit; and,
  adjusting the flow of the liquefied gas through the first conduit after it passes through the heater and independently adjusting the flow of the vapor through the second conduit to control the pressure inside the tank.

In a preferred method, the vapor in the second conduit is warmed by passing it through the heater and the flow through the second conduit between the heater and the use device is adjusted.

In the method already described the electronic controller is programmed to automatically adjust the flow through the first and second conduits based on the measured pressure.

In a preferred method, the electronic controller opens a first flow controller disposed on the first conduit which delivers liquefied gas to the use device and closes a second flow controller disposed on the second conduit which delivers vapor to the use device when the measured pressure inside the cryogen space is at or below a first preset value.

When the measured pressure inside the cryogen space is above a first preset value and below a second preset value, the electronic controller can actuate the second flow controller to increase the flow therethrough and can actuate the first flow controller for a reduced flow therethrough to gradually reduce the pressure inside the cryogen space.

When the measured pressure inside the cryogen space is above the first preset value and below a second preset value the electronic controller actuates the first flow controller to a partially open position for an increased flow therethrough, and actuates the second flow controller to a partially open position for a reduced flow therethrough to maintain the pressure inside the cryogen space.

When the measured pressure inside the cryogen space is at or above a second preset value the electronic controller closes the first flow controller and fully opens the second flow controller to quickly reduce the pressure inside the cryogen space.

In a preferred method, the use device is an internal combustion engine and the liquefied gas and vapor is fuel that is consumed by the internal combustion engine. In such methods, the electronic controller actuates at least one of the first and second flow controllers on the first and respectively the second conduit such that the ratio between the liquefied gas and the vapor delivered to the internal combustion engine is changed in a predetermined manner responsive to detected engine operating conditions.

In a preferred method the first and second flow controllers are flow control valves, that are preferably electrically actuated, for example solenoid valves. The heater can be for example an electric heater, a heat exchanger or a vaporizer.

An advantage of the disclosed system and method is that it can prevent freezing of the flow controllers because these flow controllers are placed downstream of the heater so that the fluid is warmed and converted into a gas before it circulates therethrough. By closing the flow controller on the first conduit, the system can be controlled to deliver gas only from the vapor space of the tank to allow the pressure to be reduced inside the tank faster than in the disclosed prior art. Another advantage of the disclosed system is that the operator can adjust the predetermined values of the pressure inside the tank by simply reprogramming the controller.

DETAILED DESCRIPTION OF PREFERRED EMBODIMENT(S)

The illustrated embodiments show an automatic tank pressure control that maintains the pressure inside the tank between predetermined values by actuating the flow controllers disposed on the liquid and vapor conduits based on the signal received from a pressure sensor that measures the pressure inside the pressurized tank. In one preferred embodiment the liquid and the vapor conduits both pass through the same heater and in another preferred embodiment each conduit passes through a separate heater. The heater can be for example an electrical heater, a heat-exchanger or a vaporizer. In the preferred embodiments where both liquid and vapor conduits pass through the same heater, the heater can be a multi-line heat exchanger or vaporizer, and in other preferred embodiments where each conduit passes through a separate heater, the heater can be a single-line heat exchanger or vaporizer. In yet another preferred embodiment, only the liquid conduit passes through a single-line heat exchanger or vaporizer. A "multi-line" heat exchanger or vaporizer comprises a number of fluid sources that exchange heat with a transfer fluid of a higher temperature. In a "single-line" heat exchanger or vaporizer only one fluid source exchanges heat with a transfer fluid of a higher temperature.

In all embodiments the heater is disposed upstream of the flow controllers that regulate the flow through the liquid and vapor fuel conduits to prevent their freezing. Each of the flow controllers on the liquid and vapor conduits can be actuated separately and independently so that the pressure in the tank can be reduced faster or slower, as further described below. The flow controllers on the liquid and vapor conduits can be flow control valves, more specifically electrically actuated valves, for example solenoid valves.

In the illustrated embodiments, the tank stores a cryogenic fuel that is supplied to a use device which can be a gaseous fuelled internal combustion engine. In preferred embodiments, the gaseous fuel is natural gas, but it can be any other gaseous fuel that is combustible in an engine, such as propane, ethane, methane, butane, hydrogen or mixtures thereof.

Cryogenic fuel is stored in the tank within the predetermined pressure limits and it can be delivered to a low pressure or a high pressure use device. If the use device is a gaseous fuelled internal combustion engine an example of a low pressure use device is an engine where the fuel is introduced into the intake air manifold, the intake ports or into the combustion chamber early during the compression cycle, and an example of such an engine is a spark ignited Otto Cycle internal combustion engine. For a high pressure use device, fuel can be delivered from the pressurized tank through a pump to a high pressure system such as a high pressure natural gas fuelled direct injection engine; in such an engine the fuel is typically introduced directly into the combustion chamber late in the compression cycle and ignited by compression ignition, like in a Diesel Cycle internal combustion engine.

Figure 1:
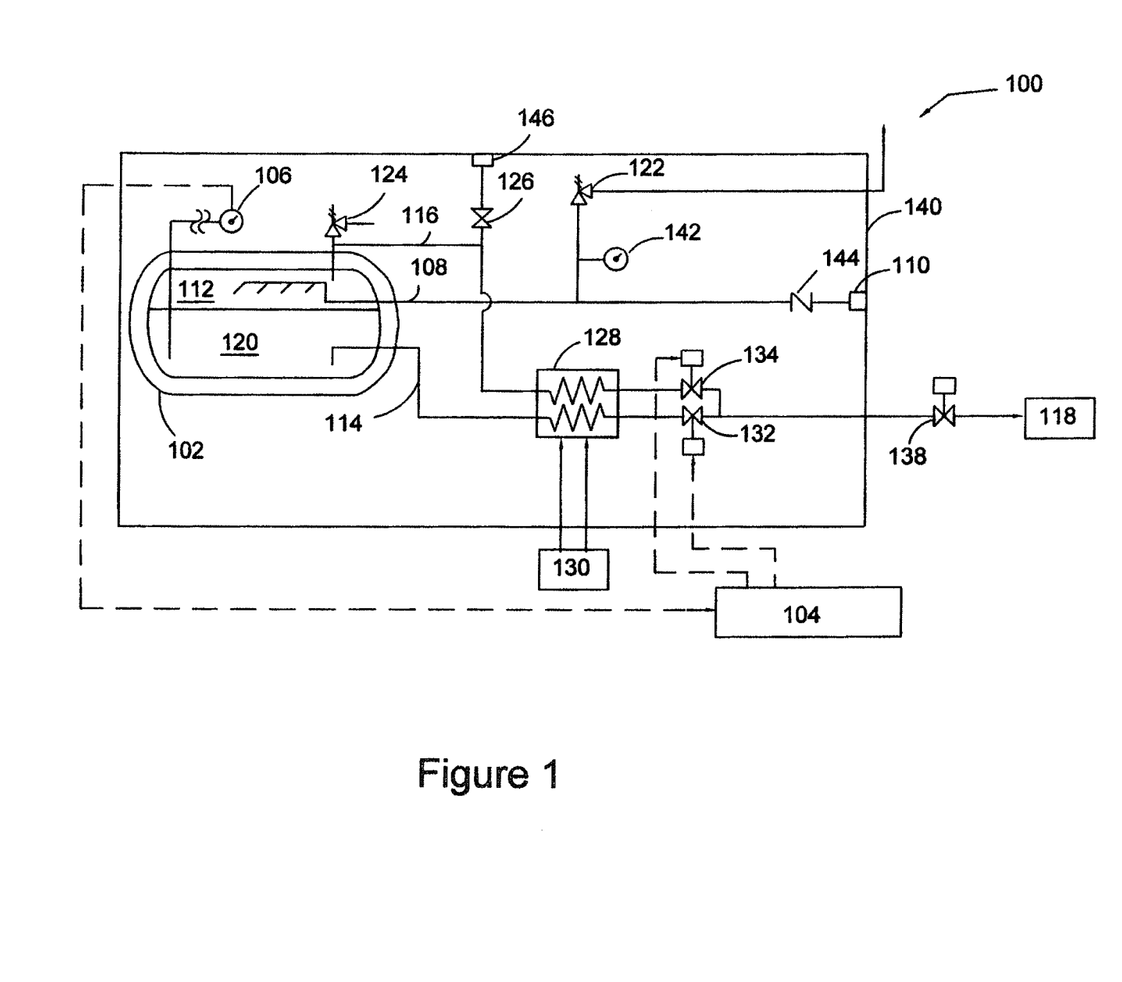
FIG. 1 is a schematic view of an automatic tank pressure control system with the vapor and the liquid fuel conduits passing through a vaporizer disposed upstream of the flow control valves that respectively regulate the flow of liquid and vapor fuels to the use device.

FIG. 1 schematically illustrates an automatic tank pressure control system 100 which comprises pressurized cryogenic tank 102 and controller 104 that controls the pressure inside the tank within the predetermined values based on the signal received from pressure sensor 106 which measures the pressure inside the tank.

The tank is filled with cryogenic liquid at a filling station through fill line 108 that is connected through fill receptacle 110 to a source of cryogenic liquid. When a storage tank for cryogenic liquids is filled, normally a portion of the cryogen space inside the tank is reserved for vapor. Filling the cryogen space completely with liquid can result in a very short holding time before vapor is vented out to relieve the pressure inside the tank. This is because even a small amount of heat leak into the cryogen space would result in liquid expansion and/or vaporization of some of the liquid, and with little or no space left for vapor and liquid to expand into, the vapor pressure inside the tank would quickly rise to a level that opens the pressure relief valve resulting in vapor being vented from the cryogen space. Upper space 112 of the cryogen space of the tank is normally occupied with vapor. Liquid occupies lower part 120 of the cryogen space of the tank. Vapor fuel conduit 116 has a first end disposed in vapor space 112 and connects the tank to use device 118. System 100 further comprises liquid fuel conduit 114 whose first end is disposed in liquid space 120 and also connects the tank to use device 118.

As mentioned above, heat from the system can be transferred to the tank. If a larger heat leak occurs, the pressure inside the tank can rise over the predetermined pressure values. To ensure that the pressure inside the tank stays within safe limits (for example, under 300 psi) several pressure relief valves can be provided in the system through which vapor is vented out to relieve the pressure inside the tank. For this purpose, primary pressure relief valve 122 is disposed on fill line 108 and secondary pressure relief valve 124 and manual vent valve 126 are disposed on vapor fuel conduit 116. It is generally preferred to use the safety valves only in emergency situations and to maintain the pressure inside the tank within the predetermined values (preferably between 85 and 120 psi) through the vaporizer and flow control valves arrangement described below.

Figure 2:
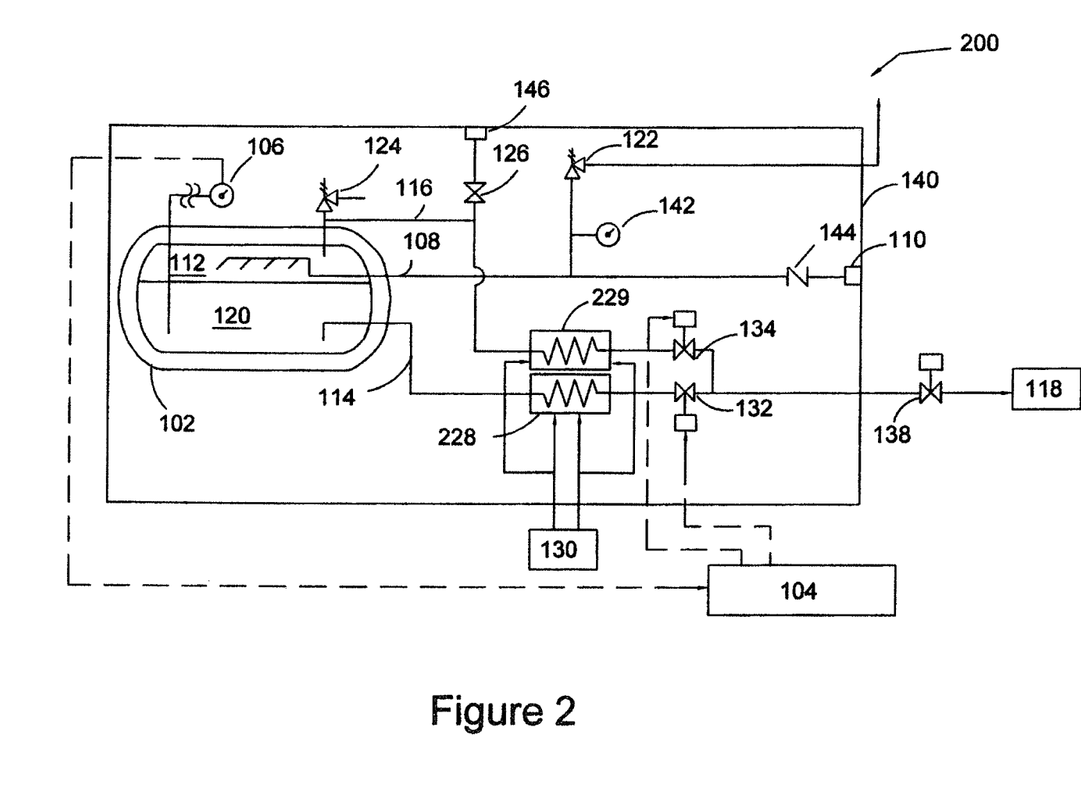
FIG. 2 is a schematic view of another embodiment of an automatic tank pressure control system wherein each of the vapor and the liquid fuel conduits passes through a separate vaporizer.
Figure 3:
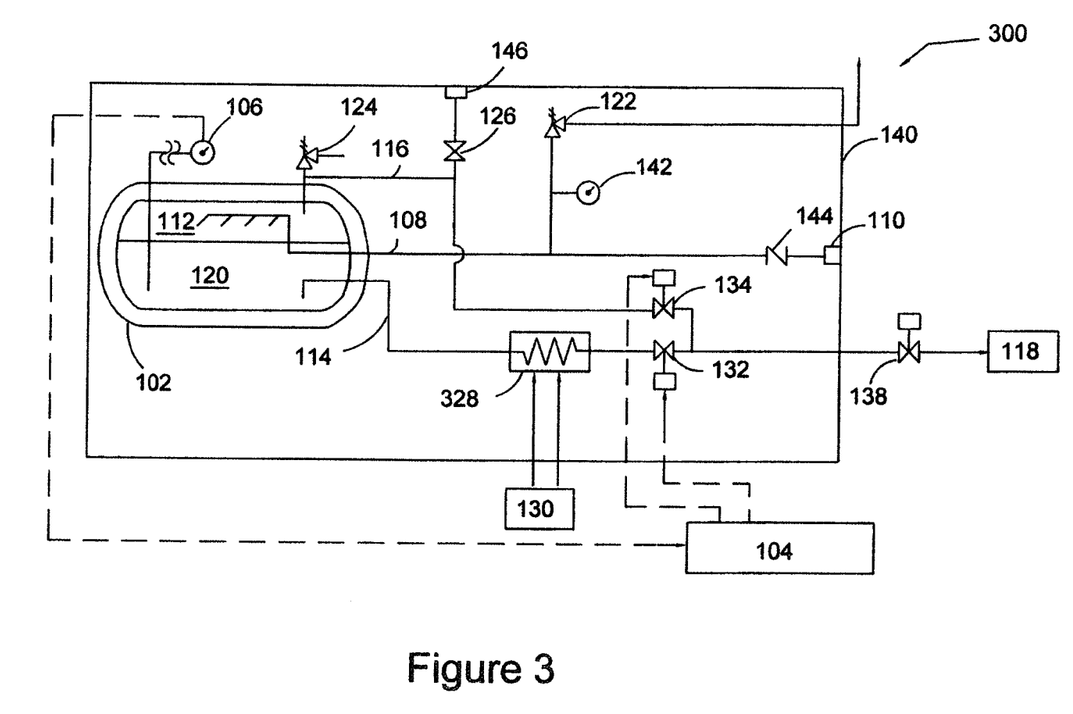
FIG. 3 is a schematic view of yet another embodiment of an automatic tank pressure control system wherein only the liquid fuel conduit passes through a vaporizer.

Both liquid fuel conduit 114 and vapor fuel conduit 116 pass through heater 128 before connecting to use device 118. Heater 128 can be a multiline vaporizer as illustrated in FIG. 1. Use device 118 can be any device that uses a vaporized cryogenic fluid. In preferred embodiments, use device 118 is a natural gas fuelled internal combustion engine. In these embodiments, transfer liquid 130 used in vaporizer 128 to vaporize the liquid fuel can be the warm coolant which exits from the internal combustion engine. The vapor and liquid conduits can either connect to the use device through separate paths or can connect to a common conduit that leads to the use device, as illustrated in FIGS. 1-3.

For adjusting the pressure in the tank as further described below, flow controller 132 is disposed on liquid fuel conduit 114 and flow controller 134 is disposed on vapor fuel conduit 116. The flow controllers can be flow control valves as illustrated in FIGS. 1-3. Both valves are disposed downstream of the vaporizer so that warm vapor fuel that leaves the vaporizer passes through the flow control valves and prevents their freezing. The flow control valves are preferably electrically actuated valves, for example solenoid valves, whose operation can be controlled by controller 104. The flow control valves are preferably a type that can be gradually opened or closed, and/or that can be commanded to intermediate open positions between being fully open and closed, to allow greater control over the fluid flow through their respective conduits. Nevertheless, though less preferred, the disclosed system and method can also employ simpler flow control valves that offer less operational adjustability between open and closed positions. In less preferred embodiments, flow control valves 132 and 134 can be a spring loaded valves that are designed to open at a preset pressure value. In these embodiments valves 132 and 134 are not actuated by controller 104.

The operation of the system for automatically controlling the pressure inside the cryogen space defined by tank 102 will be now explained in connection with the system illustrated in FIG. 1. The pressure inside tank 102 is measured by pressure sensor 106 and then it is communicated to controller 104. When the pressure inside the tank is at or below a first preset value, controller 104 closes flow control valve 134 on the vapor fuel conduit and opens flow control valve 132 on the liquid fuel conduit to remove only liquid fuel from the tank and deliver it to the use device. The first preset value is normally less than the predetermined pressure limit for storage tank 102 by an amount that includes a safety factor as required by the design codes of the jurisdiction where the storage tank will be in service. Cryogenic liquids are normally stored at relatively low pressures and the first preset value can be, for example, 100 psi. By removing only liquid from the tank at the rate that corresponds to the fuel flow necessary to the engine according to the different operation modes, the pressure inside the tank is kept relatively steady or slightly reduced. The pressure inside the tank can slightly increase or decrease depending on the mass and heat of the cryogenic liquid removed from the tank and on the leak heat into the tank from external elements.

If the tank is operating at a higher pressure, above the first preset value, but less than a second preset value which can be the pressure that would trigger the opening of the pressure relief valve 124, for example at pressures above 100 psi and below 200 psi, controller 104 opens both flow controllers 132 and 134 on the respective liquid and vapor conduits. Flow controllers 132 and 134 are actuated by controller 104 such that more gas is delivered through the liquid conduit when the pressure inside of the cryogen space is closer to the predetermined low threshold, and more gas is delivered through the vapor conduit when the pressure inside the cryogen space is closer to the predetermined high threshold. In a preferred embodiment, flow control valves 132 and 134 can open or close gradually so that the pressure inside the tank can be better controlled. When flow control valves 132 and 134 are of the type that alternate only between an open or closed position, the time the two flow control valves stay open determines how much the pressure is reduced. The pressure inside the tank is continuously measured by pressure sensor 106 and the operation of the two flow control valves is controlled accordingly by controller 104.

If the tank is operating at excessive pressures above the second preset value, for example above 200 psi, and near the pressure that would trigger the opening of the pressure relief valve 124, which can be around 230 psi, in order to reduce the pressure inside the tank as quickly as possible, controller 104 closes flow controller 132 on the liquid fuel conduit and opens flow controller 134 on the vapor fuel conduit so that only vapor fuel from the vapor space of the tank is supplied to the engine and the pressure inside the tank is quickly reduced. Supplying only vapor to the engine might limit the performance for a short period of time due to the pressure drop caused by the reduced density of the fuel supplied to the engine. This effect can be mitigated by the length of time the flow control valve on the liquid fuel conduit stays closed.

During the time when the use device is shut off and the pressure inside the tank decreases below another preset value, for example below 70 psi, flow control valves 132 and 134 on the liquid fuel and vapor fuel conduits are left open to allow the migration of liquid out of the tank. The liquid removed from the tank vaporizes because the system components are at ambient temperature. Because there is backpressure in the liquid filled conduit, the vaporized liquid is returned to the tank through the vapor fuel conduit which causes an increase in pressure inside the tank. This process needs to be managed carefully to avoid over-pressurizing the tank.

The system illustrated in FIG. 1 can include a few other elements that are well known in the prior art, for example solenoid valve 138 placed outside of shroud 140 for controlling the fluid delivered to the use device, second pressure sensor 142 that measures the pressure in the fill line, fill check valve 144 disposed on fill line 108 and vent fitting 146 for venting out the vapor from the vapor conduit. An advantage of the disclosed system is that all the components can be placed inside shroud 140.

FIGS. 2 and 3 illustrate other embodiments of the disclosed automatic tank pressure control system. These embodiments have many components that are equivalent to like components of the embodiment presented in FIG. 1 and like components are identified by like reference numbers. In this disclosure, like-numbered components function in substantially the same way in each embodiment. Accordingly, if like components have already been described with respect to one embodiment, while identified in the figures for other embodiments, the description of the purpose and function of like components may not be repeated for each of the illustrated embodiments.

The main difference between the first embodiment and the tank pressure control system illustrated in FIG. 2 is that heater 229 is disposed only on vapor fuel conduit 116 and heater 228 is a separate heater disposed only on liquid fuel conduit 114. Both heaters can be single-line vaporizers as illustrated in FIG. 2. While this arrangement introduces one additional system component it provides some advantages. For example, when a vaporizer in the system needs servicing a single-line vaporizer is easier to maintain and replace compared to a multi-line vaporizer. The rest of the components of this second embodiment are similar and have the same function as the components of the first embodiment illustrated in FIG. 1. Flow controllers 132 and 134 are disposed downstream of respective heaters 228, and 229 so that only fluid that has been warmed by passing through the heaters passes through the flow controllers, protecting them from freezing. The flow controllers can be flow control valves, preferably electrically actuated valves, for example solenoid valves, whose operation can be controlled by controller 104. Like in other embodiments, the flow control valves are preferably of the type that can be gradually opened or closed, and/or commanded to intermediate positions.

The operation of the second embodiment of the automatic tank pressure control system is similar to the operation of the first embodiment. The pressure inside tank 102 is measured by pressure sensor 106 and it is communicated to controller 104. When the pressure inside the tank is at or below a first preset value, flow control valve 134 on the vapor fuel conduit is closed and flow control valve 132 on the liquid fuel conduit is opened to supply vaporized liquid fuel to the use device. The first preset value can be for example 100 psi. By removing only liquid from the tank at a rate that corresponds to the fuel flow necessary to satisfy engine fuel demands to meet current engine operating needs, the pressure inside the tank is kept relatively steady or slightly reduced.

If the tank is operating at a higher pressure, above the first preset value, but below a second preset value which can be the pressure that would trigger the opening of the pressure relief valve 124, for example at pressures above 100 psi and below 200 psi, controller 104 opens both flow control valves 132 and 134 on the respective liquid and vapor fuel conduits. Flow controllers 132 and 134 are actuated by controller 104 such that more gas is delivered through the liquid conduit when the pressure inside of the cryogen space is closer to the predetermined low threshold, and more gas is delivered through the vapor conduit when the pressure inside the cryogen space is closer to the predetermined high threshold. In a preferred embodiment, flow control valves 132 and 134 can open or close gradually so that the pressure inside the tank can be better controlled.

If the tank is operating at excessive pressures above the second preset value, for example around 200 psi, and near the pressure that would trigger the opening of the pressure relief valve 124, which can be around 230 psi, in order to reduce the pressure inside the tank as quickly as possible controller 104 closes flow control valve 132 on the liquid conduit and opens flow control valve 134 on the vapor conduit so that only vapor fuel from the vapor space of the tank is supplied to the engine and the pressure inside the tank is reduced more quickly, compared to when both flow control valves 132 and 134 are open.

During the time when the use device is shut off and the pressure inside the tank decreases below another preset value, for example to 70 psi, valves 132 and 134 on the liquid fuel and vapor fuel conduits are left open to allow the migration of the liquid out of the tank. The liquid removed from the tank vaporizes and it is returned to the tank through the vapor fuel conduit which determines an increase in pressure inside the tank.

The third embodiment of the tank pressure control system is illustrated in FIG. 3. The main difference between this embodiment and the previous embodiments is that it comprises heater 328, which can be a single-line vaporizer disposed only on liquid fuel conduit 114. Because vapor fuel that leaves the tank is less dense than the liquid fuel, less energy is required to warm up the vapor as it circulates through vapor fuel conduit 116 and therefore the temperature of the vapor will increase before it reaches flow control valve 134 and before it is delivered to the use device, especially if the vapor conduit between tank 102 and flow control valve 134 is long enough to allow enough heat transfer from the surrounding environment. Therefore there is less potential for freezing flow control valve 134. This arrangement eliminates one component from the system of the second embodiment shown in FIG. 2 and substitutes a single-line vaporizer for the multi-line vaporizer of the first embodiment shown in FIG. 1.

The operation of the third embodiment of the automatic tank pressure control system is similar to the operation of the first embodiment. The pressure inside tank 102 is measured by pressure sensor 106 and is communicated to controller 104. When the pressure inside the tank is at or below a first preset value, flow control valve 134 on the vapor fuel conduit is closed and flow control valve 132 on the liquid fuel conduit is opened to supply vaporized liquid fuel to the use device. The preset value can be for example 100 psi. By removing only liquid from the tank at the rate that corresponds to the fuel flow necessary to the engine according to the different operation modes, the pressure inside the tank is kept relatively steady or slightly reduced.

If the tank is operating at a higher pressure, above the first preset value, but less than a second preset value, which can be the pressure that would trigger the opening of the pressure relief valve 124, for example at pressures higher than 100 psi and lower than 200 psi, controller 104 opens both flow control valves 132 and 134 on the respective liquid and vapor fuel conduits. Flow controllers 132 and 134 are actuated by controller 104 such that more gas is delivered through the liquid conduit when the pressure inside of the cryogen space is closer to the predetermined low threshold, and more gas delivered through the vapor conduit when the pressure inside the cryogen space is closer to the predetermined high threshold. In a preferred embodiment, flow control valves 132 and 134 can open gradually so that the pressure inside the tank can be better controlled.

If the tank is operating at excessive pressures above the second preset value, for example above 200 psi, in order to reduce the pressure inside the tank as quickly as possible controller 104 closes flow control valve 132 on the liquid conduit and opens flow control valve 134 on the vapor conduit so that only vapor fuel from the vapor space of the tank is supplied to the engine and the pressure inside the tank is quickly reduced.

During the time when the use device is shut off and the pressure inside the tank decreases below another preset value, for example to 70 psi, flow control valves 132 and 134 on the respective liquid fuel and vapor fuel conduits are left open to allow the migration of liquid out of the tank. The liquid removed from the tank vaporizes and it is returned to the tank through the vapor fuel conduit which causes an increase in pressure inside the tank.

In some systems the composition of the fuel supplied to the use device, respectively the ratio between the vapor and liquid fuels influences the operation of the device. For example, in a spark ignited internal combustion engine higher methane content is preferred when the engine is working at high loads. In such embodiments the flow control valves on the liquid and vapor fuel conduits can be controlled to slightly vary the ratio content in the fuel delivered to the engine according to its operation while preserving the pressure inside the tank within the predetermined limits. Also, when the vehicle is idling it is preferred to supply only vapor fuel to the engine, but when the vehicle is operating at full load a mixture of vapor and liquid fuels is preferred. The controller can adjust the opening of the flow control valves on the liquid fuel and vapor fuel conduits to ensure the delivery of a preferred liquid fuel/vapor fuel ratio to the engine.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A pressure control system comprising:
    a storage tank defining a cryogen space for storing a liquefied gas and vapor at cryogenic temperatures;
    a first conduit through which the liquefied gas can be delivered to a use device, the first conduit connecting a lower portion of the cryogen space to the use device;
    a heater that is operable to vaporize the liquefied gas before it is delivered to the use device, the heater being disposed on the first conduit upstream from the use device;
    a first flow controller disposed on the first conduit downstream from the heater;
    a second conduit through which vapor can be delivered to the use device, the second conduit connecting a vapor space inside the cryogen space to the use device;
    a second flow controller disposed on the second conduit,
    a pressure sensor to measure the pressure inside the cryogen space, and
    a controller programmed to actuate both first and second flow controllers responsive to pressure measurements by the pressure sensor to maintain the pressure inside the cryogen space between predetermined values.

2. The pressure control system of claim 1 wherein the heater is a heat exchanger.

3. The pressure control system of claim 1 wherein the heater is a multi-line heat exchanger.

4. The pressure control system of claim 1 wherein the heater is a vaporizer.

5. The pressure control system of claim 1 wherein the liquefied gas comprises at least on of methane, ehtane, natural gas, hydrogen, butane, propane, including mixtures thereof.

6. The pressure control system of claim 1 wherein the second conduit delivers vapor to the heater which is operable to warm the vapor before it is delivered to the use device, and the second flow controller is disposed on the second conduit downstream from the heater.

7. The pressure control system of claim 1 wherein the use device is an internal combustion engine.

8. The pressure control system of claim 1 wherein the liquefied gas comprises at least one of methane, ethane, natural gas, hydrogen, butane, propane, including mixtures thereof.

9. The pressure control system of claim 1 further comprising a second heater separate from the heater connected to the first conduit, wherein the second conduit is connected to the second heater for warming the vapor upstream of the second flow controller.

10. The pressure control system of claim 1 wherein the first and second flow controllers are electrically actuated valves.

11. A method for controlling pressure inside a cryogen space defined by a storage tank, and delivering fluid from the cryogen space to a use device, the method comprising:
    measuring the pressure inside the cryogen space with a pressure sensor;
    communicating the measured pressure to an electronic controller;
    directing liquefied gas being delivered from the cryogen space to the use device through a first conduit that passes through a heater and transforming the liquefied gas into vapor;
    directing vapor delivered from the cryogen space to the use device through a second conduit; and,
    programming the electronic controller to automatically adjust the flow through the first and second conduits based on the measured pressure to maintain pressure inside the tank between predetermined values.

12. The method of claim 11 further comprising warming the vapor in the second conduit by passing it through the heater and adjusting flow through the second conduit between the heater and the use device.

13. The method of claim 11 wherein the electronic controller opens a first flow controller disposed on the first conduit and closes a second flow controller disposed on the second conduit when the measured pressure inside the cryogen space is at or below a first preset value.

14. The method of claim 11 wherein the electronic controller actuates a first flow controller disposed on the first conduit for a reduced flow therethrough and actuates a second flow controller disposed on the second conduit to increase the flow therethrough to gradually reduce the pressure inside the cryogen space when the measured pressure inside the cryogen space is above a first preset value and below a second preset value.

15. The method of claim 11 wherein the electronic controller actuates a first flow controller disposed on the first conduit to a partially open position for an increased flow therethrough, and actuates a second flow controller disposed on the second conduit to a partially open position for a reduced flow therethrough to maintain the pressure inside the cryogen space by allowing fluid to flow through both the first and second conduits when the measured pressure inside the cryogen space is above a first preset value and below a second preset value.

16. The method of claim 11 wherein the electronic controller closes a first flow controller disposed on the first conduit and fully opens a second flow controller disposed on the second conduit when the measured pressure inside the cryogen space is at or above a second preset value.

17. The method of claim 11 wherein the electronic controller opens a first controller disposed on the first conduit and a second flow controller disposed on the second conduit to increase the pressure in the cryogen space when the engine is shut off.

18. The method of claim 11 wherein the use device is an internal combustion engine and the liquefied gas and vapor is fuel that is consumed by the internal combustion engine.

19. The method of claim 11 wherein the electronic controller actuates at least one controller disposed on the first or the second conduit such that the ratio between the liquefied gas and the vapor delivered to the internal combustion engine is changed in a predetermined manner responsive to detected engine operating conditions.

* * * * *